May 21, 1963   R. H. WHITE ET AL   3,090,109
APPARATUS FOR ASSEMBLING NEEDLE THRUST BEARINGS
Original Filed Dec. 30, 1955   2 Sheets-Sheet 1
FIG. 1.
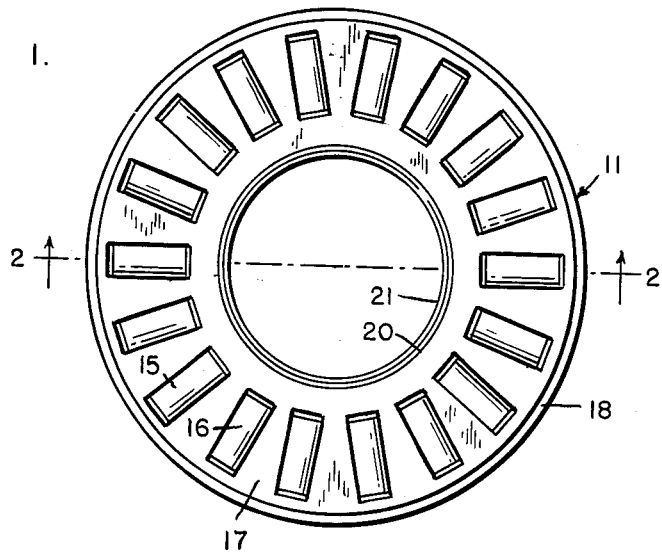
FIG. 2.
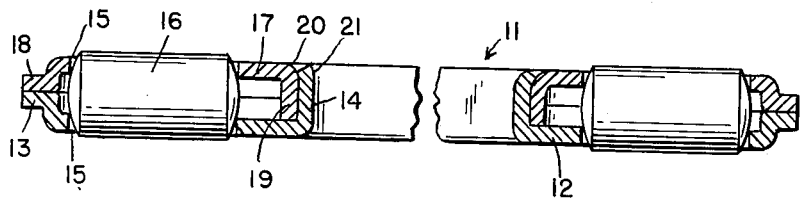
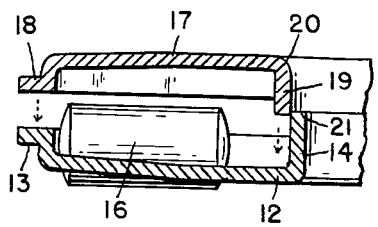
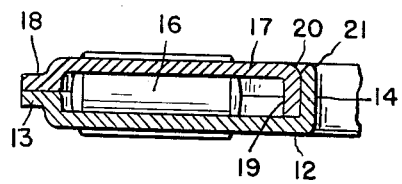
FIG. 3.   FIG. 4.
P. A. CARULLO
R. H. WHITE
INVENTORS
BY Mason, Porter, Miller & Stanard
ATTORNEYS May 21, 1963 R. H. WHITE ET AL 3,090,109
APPARATUS FOR ASSEMBLING NEEDLE THRUST BEARINGS
Original Filed Dec. 30, 1955 2 Sheets-Sheet 2
FIG. 5.
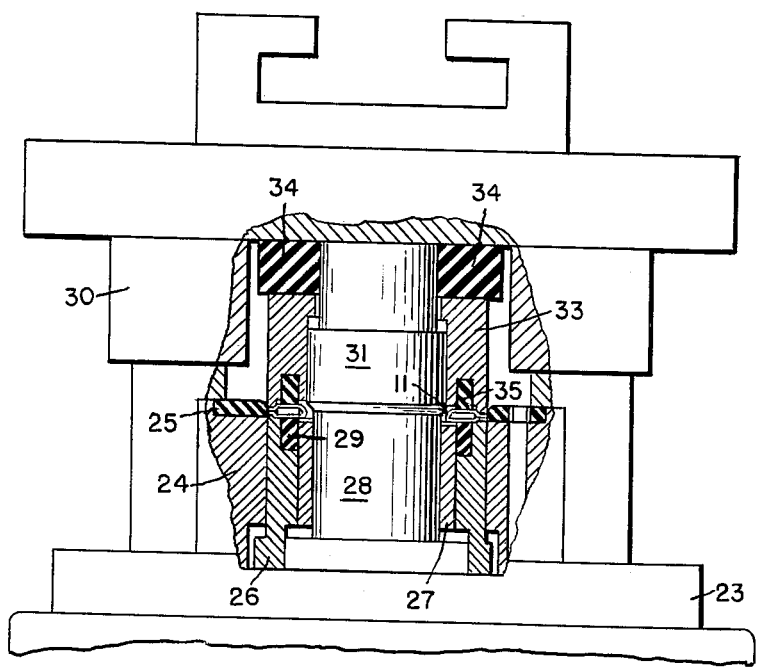
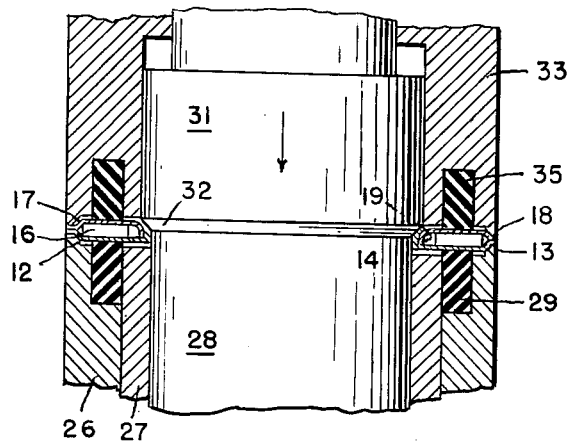
FIG. 6.
P. A. CARULLO
R. H. WHITE
INVENTORS
BY *Mason, Porter, Miller & Stewart*
ATTORNEYS United States Patent Office 3,090,109
Patented May 21, 1963

3,090,109
APPARATUS FOR ASSEMBLING NEEDLE THRUST BEARINGS
Robert H. White and Paul A. Carullo, Torrington, Conn., assignors to The Torrington Company, Torrington, Conn.
Original application Dec. 30, 1955, Ser. No. 556,688. Divided and this application Sept. 12, 1960, Ser. No. 55,260
11 Claims. (Cl. 29—201)

The invention to which the following specification relates is of a novel means for assembling needle roller thrust bearings. The adaptation of small needle rollers for use in thrust bearings is dependent largely on the design of suitable retainers for ease of assembly and efficiency. Bearings having improved structure and particular forms of retainers are, however, subject to difficulty in assembly by ordinary means.

One object of the invention is to assemble needle roller thrust bearings so as to assure a firm engagement between the outer flanges of the retainer members without the use of separate fastening means.

A further object of the invention is to assemble the parts of the bearing in such a manner that the retainers shall have their roller carrying slots in accurate registration, using the needle rollers to accomplish this purpose.

A still further object of the invention is to hold the retainers in abnormally tight engagement with the needle rollers during the fastening step in assembly, at the same time leaving the retainers free to spring apart slightly after assembly. In this way the retainers will normally clear the rollers, enabling the latter to rotate freely.

It is also an object of this invention to provide suitable means for accomplishing the result sought in the above method. Thus it is an object to provide a fixture in which the parts of the bearing are held in place during assembly.

The novel means also includes means for bringing the retainers together into tight engagement with the rollers, telescoping the inner rims or collars of the retainers.

It is likewise an object of the invention to provide means for staking, curling, spinning or otherwise attaching the inner rim or collar of one retainer in fastening engagement over the inner rim or collar of the opposite retainer.

Other and further objects of the invention will be readily understood from the following description of the novel method of assembly and the preferred form of means to accomplish it.

In the drawings:
FIG. 1 is a plan view of the complete needle roller thrust bearing on an enlarged scale;
FIG. 2 is a transverse cross-section taken on line 2—2 in FIG. 1;
FIG. 3 is an enlarged fragmentary cross-sectional view of the bearing parts in position for assembly;
FIG. 4 is a similar view of the parts in assembly;
FIG. 5 is a vertical elevation partly in section of the improved press for assembling the bearings and
FIG. 6 is a fragmentary vertical section showing the assembling operation in greater retail.

The improved method for the assembly of the needle roller thrust bearing has been shown as applied to a bearing illustrated in FIGS. 1, 2 and 3. Here the bearing 11 is constructed from three different elements.

A lower retainer 12 in the form of a plate or disk is shown in its normal position in FIG. 3. Here it is shown to be slightly conical, that is, dished upwardly. The member 12 has an outer flange 13 around its rim. A circular collar 14 forms the inner part of the retainer 12. This collar extends above the normal plane of the flange 13.

A series of radial slots 15 extend intermediate the collar 14 and the flange 13. Each slot is designed to receive a needle roller 16, without however, being wide enough to permit the roller to fall through the slot 15.

A complementary upper retainer 17 is also constructed slightly dished or conical downwardly, as shown in FIG. 3. The retainer 17 has an outer flange 18. An inner collar 19 is also provided. This collar has an inner diameter slightly larger than the outside diameter of the corresponding collar 14. As shown in the drawings, this will permit the collar 19 to slide down around the collar 14.

It will also be noted that the collar 19 is not as wide as the collar 14. The end of the collar 19 will therefore rest against the wall of the retainer 12 when the upper edge of the collar 14 projects above the curve 20 of the collar 19.

The upper retainer 17 carries slots 15 above described, through which the needle rollers 16 partly project.

It is important to note from FIG. 4 that when the collar 19 rests against the retainer 12, the retainers 12 and 17 have lost their dished formation and are substantially parallel.

The retainers are held in place by shaping the upper edge of collar 14 to form a curved edge 21 over the curve 20 of the upper retainer 17. This is shown in FIG. 4.

The improved mode of assembling the bearing as above described involves a sequence of steps.

The first step consists in bringing the upper retainer 17 down over the needle roller 16 until the flange 18 is resting upon the flange 13. At this point both retainers 12 and 17 are still dished or conical.

By continued compression of the retainers, the rollers 16 serve as keys, causing slight relative rotation between the retainers until the slots 15 are in direct registration.

At this point the edges of the slot bind against the surfaces of the rollers so that the latter are not easily rotated.

In the course of this compression, the retainers 12 and 17 may become slightly concave on the outside.

The collar 19 having been seated firmly upon retainer 12, the upper edge of 21 of collar 14 is bent over the curve 20 of the collar 19. This locks the two collars firmly together so that they cannot spring apart nor rotate with respect to each other.

Release of pressure against the retainers permits them to resume parallelism as shown in FIG. 4.

At the same time, the flanges 13 and 18 are held firmly compressed so that there is no likelihood of accidentally opening at this point.

In its final form the retainers 12 and 17 have sprung away sufficiently from the rollers 16 to permit the latter to rotate freely.

Novel means have been arranged for carrying out the above mode of assembly. In the preferred form illustrated on FIGS. 5 and 6, is shown a press having a base or fixed member 23. This base carries a housing 24 with a substantially circular recess or bore.

The upper edge of the housing 24 is provided with a metallic confining ring 25 which may be an integral part of the housing. This rings locates and restricts outer retainer rims 13 and 18 on the outer diameter while shaping lip 21.

A sleeve 26 is fitted vertically within the recess of the housing 24. It has a lower expanded base by which it is prevented from movement.

A liner 27 is provided within the sleeve 26. Centrally of the liner there is a center post 28 which rests upon the base 23.

A cushion ring 29 of elastic or resilient material is set within the upper edge of the sleeve 26 opposite the cushion ring 35.

This cushion ring 29 supports the parts of the bearing 11 consisting of the lower retainer, the needle rollers and the upper retainer. These parts are held in place by engagement between the confining ring 25 and the center post 28 and seat on lines 26 and 27.

An upper press member 30 is vertically movable above the parts above described. The press member carries a plunger or punch 31 which has a bevelled edge 32. This plunger may be fixed for staking or rotatable for spinning. Spinning is accomplished by rotating a spindle inside sleeve 33 with a separate driving motor.

A sleeve 33 fits around the head of the punch 31 loosely and is reciprocated with it. A cushion pad 34 reinforces the sleeve 33.

A lower face of the sleeve 33 carries a resilient or elastic cushion ring 35 opposite the ring 29.

By means of this fixture it will be evident that provision has been made to place the lower retainer 12 conical side up, within the ring 25. When so placed, the lower retainer disk 12 also carries the needle rollers 16 and the upper retainer disk 17 face down. At the same time the collars 14 and 19 rest close to the center post 28.

If then the upper press member 30 be lowered, it will first bring the cushion rings 29 and 35 against the sides of the bearing parts. Engagement will be made first with the protruding surfaces of the rollers 16. However, as the cushion rings come together, their edges or faces bear upon the disks 12 and 17 in the narrow portions between the slots and intermediate the outer flanges and the inner collars. In this way the disks are compressed until they may are no longer conical. In fact, they may be bent down until they bear against the sides of the rollers.

At this point the rollers will reach a position of repose circumferentially with the slots 15 of the disks 12 and 17 in registration.

Further downward movement of punch 31 and its bevelled edge 32 wil serve to drive the edge 21 of the collar 14 over the curve 20 of the collar 19. This shaping by pressing or spinning operation serves to lock the collars together and also prevents further relative rotary movement of the retainer disks.

As soon as the plunger is raised, the resilient disks straighten out to the form shown in FIG. 4 with the surfaces substantially parallel. However, the parts are still prevented from relative rotation. The rollers are free to rotate. The bearings retain this form after removal from the press.

It is evident that the above described improved mode of assembling the bearings can be accomplished in several ways within the general principles outlined above. Thus the compression can be accomplished with the use of a single resilient cushion ring 35 by which the upper retainer is pressed on the rollers and the latter into tight engagement with the lower retainer disk. The inner collars are secured together in any suitable manner either by staking, point-staking, spinning, welding, brazing, or the like.

In like manner the provisions afforded by the press means described and illustrated can be carried out by changes in arrangement, material and relative proportions without departing from the scope of the following claims.

This application for patent is a division of our application filed December 30, 1955, Ser. No. 556,688, now abandoned.

What we claim is:

1. Apparatus for assembling roller thrust bearings comprising a lower press member having a base and a center post, a sleeve on the base for supporting one of two annular bearing members around the post, a vertically movable, upper press member having a sleeve opposite the lower sleeve, a punch carried by the upper press member, and a resilient ring on one of said sleeves concentric with said punch for holding one of said annular bearing members free for annular adjustment relative to the other bearing member during their assembly.

2. Apparatus for assembling roller thrust bearings comprising a lower press member having a base and a center post, a sleeve on the base for supporting one of two annular bearing members around the post, a vertically movable, upper press member having a sleeve opposite the lower sleeve, a punch carried by the upper press member, and a resilient ring on said lower sleeve concentric with the punch for holding the adjacent bearing member free for angular adjustment relative to the other bearing member during their assembly.

3. Apparatus for assembling roller thrust bearings comprising a lower press member having a base and a center post, a sleeve on the base for supporting one of two annular bearing members around the post, a vertically movable, upper press member having a sleeve opposite the lower sleeve, a punch carried by the upper press member, and a resilient ring on said upper sleeve concentric with the punch for holding the adjacent bearing member free for angular adjustment relative to the other bearing member during their assembly.

4. Apparatus for assembling roller thrust bearings comprising a lower press member having a base and a center post, a lower sleeve on the base for supporting one of two annular bearing members around the post, a vertically movable upper press member having a punch, an upper sleeve slidably carried by the punch opposite the lower sleeve, and a resilient ring on the bottom face of said upper sleeve concentric with the punch for holding the adjacent annular bearing member free for angular adjustment relative to the other bearing member during their assembly.

5. Apparatus for assembling roller thrust bearings comprising a lower press member having a base and a center post, a lower sleeve on the base for supporting one of two annular bearing members around the post, a vertically movable upper press member having a punch, an upper sleeve slidably carried by the punch opposite the lower sleeve, and a resilient ring projecting upwardly from the face of the lower sleeve concentric with the punch for initial engagement with the adjacent annular bearing member for holding the latter free for angular adjustment relative to the other bearing member during their assembly.

6. Apparatus for assembling roller thrust bearings comprising a lower press member having a base and a center post, a lower sleeve on the base for supporting one of two annular bearing members around the post, a vertically movable upper press member having a punch, an upper sleeve slidably carried by the punch opposite the lower sleeve, and resilient rings projecting from the opposing faces of each sleeve concentric with the punch for initial engagement with the adjacent annular bearing members for holding the latter free for angular relative adjustment during their assembly.

7. Apparatus for assembling roller thrust bearings comprising a lower press member having a base and a center post, a lower sleeve on the base for supporting one of two annular bearing members around the post, a vertically movable upper press member having a spinning tool, an upper sleeve slidably carried by the upper press member opposite the lower sleeve and a resilient ring on one of said sleeves concentric with the punch for holding one of said annular bearing members free for angular adjustment relative to the other bearing member during their assembly.

8. Apparatus for assembling roller thrust bearings comprising a lower press member having a base, a center post, and a lower surrounding sleeve for supporting one of two annular bearing members around the post, a housing outside of the sleeve, a ring on the housing concentric with the sleeve for centering the parts of the bearing, a vertically movable upper press member having a sleeve opposite the lower sleeve and a punch carried by the upper press member.

9. Apparatus for assembling roller thrust bearings comprising a lower press member having a base and a center post, a sleeve on the base for supporting one of two annular bearing members around the post, a vertically movable upper press member having a sleeve opposite the lower sleeve, a resilient ring on each of said sleeves concentric therewith for holding said bearing members free for relative angular adjustment during their assembly, a ring on the housing concentric with the sleeves for centering the parts of the bearing and a punch carried by the upper press member, said punch having a work-engaging portion opposite said ring.

10. Apparatus for assembling roller thrust bearings comprising a lower press member having a base and a center post, a sleeve on the base for supporting one of two annular bearing members around the post, a vertically movable upper press member having a sleeve opposite the lower sleeve, a resilient pad between the upper press member and its associated sleeve, a resilient ring on each of said sleeves concentric therewith for holding said bearing members for relative angular adjustment, during their assembly, a ring on the housing concentric with the sleeves for centering the parts of the bearing and a punch carried by the upper press member, said punch having a work-engaging portion opposite said ring.

11. Apparatus for assembling roller thrust bearings comprising a lower press member having a base and a center post, a liner loosely surrounding said post, a sleeve around the liner, said liner and sleeve jointly supporting one of two annular bearing members around the post, a vertically movable upper press member having a sleeve opposite the lower sleeve and the liner, a punch carried by the upper press member, and a resilient ring on one of said sleeves concentric therewith for holding one of said annular bearing members during their assembly free for angular adjustment relative to the other bearing member.

References Cited in the file of this patent
UNITED STATES PATENTS

| | | |
|---|---|---|
| 1,387,881 | Bingham | Aug. 16, 1921 |
| 2,136,308 | Miller | Nov. 8, 1938 |
| 2,304,581 | Lyon | Dec. 8, 1942 |
| 2,342,858 | Hansen | Feb. 29, 1944 |
| 2,388,838 | Egli | Nov. 13, 1945 |